(12) United States Patent
Waggoner et al.

(10) Patent No.: US 8,650,864 B2
(45) Date of Patent: Feb. 18, 2014

(54) COMBINATION LIQUID-COOLED EXHAUST MANIFOLD ASSEMBLY AND CATALYTIC CONVERTER ASSEMBLY FOR A MARINE ENGINE

(75) Inventors: Richard J. Waggoner, Punta Gorda, FL (US); Richard B. Laporte, Collierville, TN (US); Charles L. Gerlach, Collierville, TN (US); Robert F. Novotny, Jr., Millington, TN (US); Timothy G. Maher, Hale, MI (US)

(73) Assignee: Indmar Products Company Inc., Millington, TN (US)

( * ) Notice: Subject to any disclaimer, the term of this patent is extended or adjusted under 35 U.S.C. 154(b) by 282 days.

(21) Appl. No.: 13/276,601

(22) Filed: Oct. 19, 2011

(65) Prior Publication Data

US 2013/0098007 A1 Apr. 25, 2013

(51) Int. Cl.
*F01N 3/00* (2006.01)
*F01N 1/00* (2006.01)

(52) U.S. Cl.
USPC ............... 60/298; 60/320; 60/321; 60/323; 29/890.08

(58) Field of Classification Search
USPC ................... 60/274–324; 29/890.08
See application file for complete search history.

(56) References Cited

U.S. PATENT DOCUMENTS

| 4,202,310 | A  | * | 5/1980  | Zorrilla et al. ............... 123/668 |
| 4,711,088 | A  | * | 12/1987 | Berchem et al. .............. 60/321  |
| 5,148,675 | A  | * | 9/1992  | Inman ........................... 60/321 |
| 5,916,137 | A  | * | 6/1999  | Hayashi ......................... 60/323 |
| 6,397,589 | B1 | * | 6/2002  | Beson et al. .................... 60/320 |
| 7,013,565 | B1 | * | 3/2006  | Zelinski .................... 29/890.08 |
| D541,302  | S  |   | 4/2007  | Martin, III et al. |
| D614,104  | S  |   | 4/2010  | Waggoner et al. |
| 7,788,913 | B2 |   | 9/2010  | Midgley et al. |
| 7,827,690 | B1 | * | 11/2010 | Zelinski .................... 29/890.08 |
| 2004/0050039 | A1 | * | 3/2004 | Matsuda ......................... 60/323 |
| 2007/0180820 | A1 | * | 8/2007 | Kenyon et al. .................. 60/323 |
| 2009/0175772 | A1 |   | 7/2009 | Hansen et al. |
| 2010/0112878 | A1 | * | 5/2010 | White et al. ................ 440/89 H |
| 2010/0229540 | A1 |   | 9/2010 | Waggoner et al. |

* cited by examiner

*Primary Examiner* — Jesse Bogue
(74) *Attorney, Agent, or Firm* — Wood, Herron & Evans, LLP

(57) ABSTRACT

An exhaust system for a marine engine comprising liquid-cooled manifold and catalytic converter assemblies. Each assembly uses a separate cooling system to cool either the exhaust manifold or a shell inside which resides the catalytic converter. The housing or shell containing the catalytic converter uses water to cool an exterior surface of a water jacket to an acceptable temperature conforming to federal regulations. The liquid-cooled manifold assembly may use either water or glycol to cool outer cooling tubes surrounding exhaust tubes extending from the engine block to the catalytic converter assembly.

20 Claims, 8 Drawing Sheets

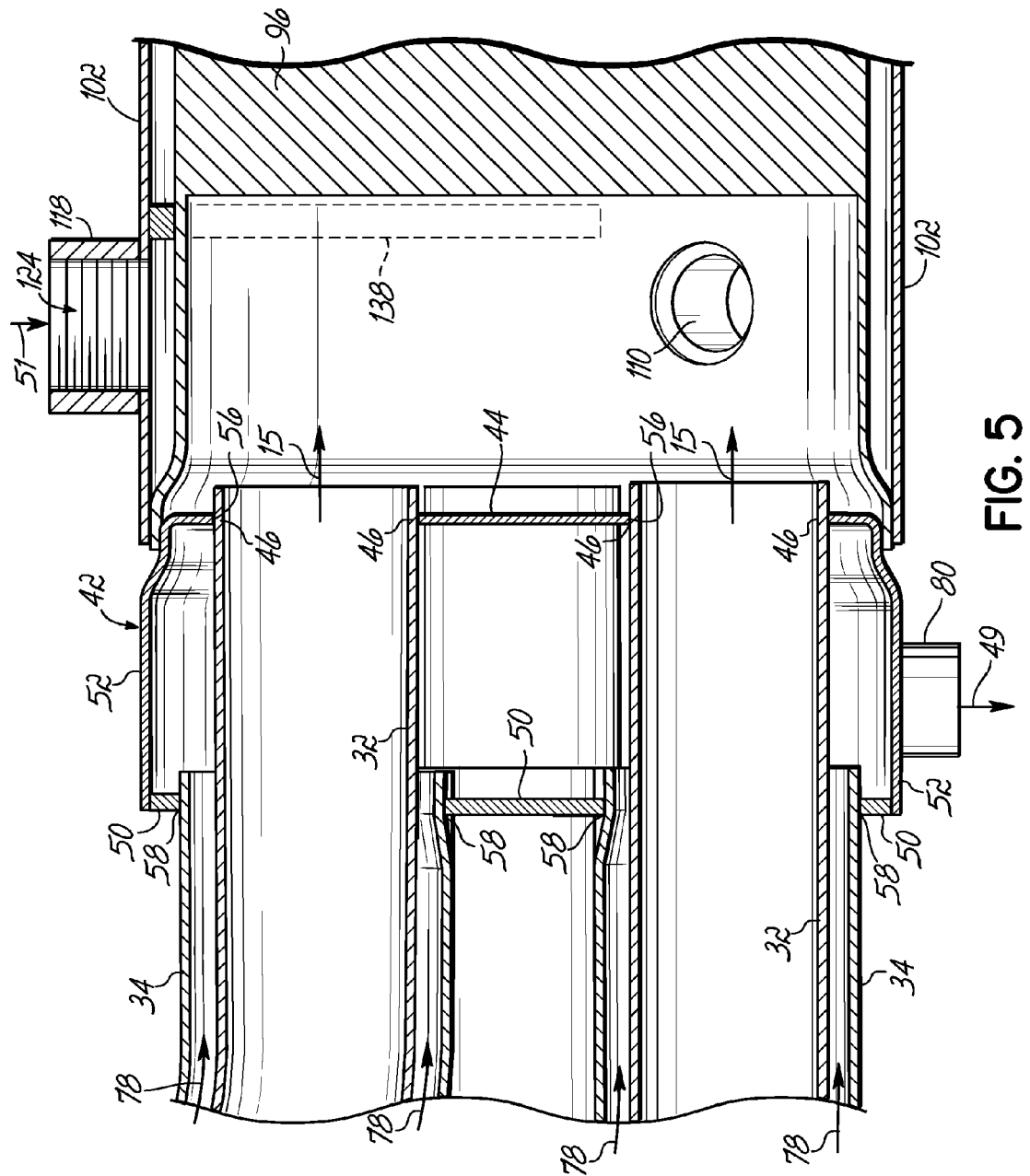

COMBINATION LIQUID-COOLED EXHAUST MANIFOLD ASSEMBLY AND CATALYTIC CONVERTER ASSEMBLY FOR A MARINE ENGINE

FIELD OF THE INVENTION

The present invention relates to exhaust systems for combustion engines and, more particularly, to the exhaust manifold and catalytic converter of such exhaust systems.

BACKGROUND OF THE INVENTION

Exhaust systems for a combustion engine generally include a manifold connected to the combustion engine at one end and bolted to an exhaust pipe at the other end. The exhaust pipe extends a distance from the manifold and generally has a catalytic converter system bolted thereto. These catalytic converter systems generally include a ceramic substrate having a catalyst coated thereon and a metal housing surrounding the substrate. In general, the catalysts require a minimum temperature to react with the emissions and reduce them. Higher reaction temperatures enhance the removal of harmful emissions from the exhaust gases. The core temperature of conventional catalytic converters is typically 1,000 to 1,400° F. In automobile applications, the exterior surfaces of the catalytic converters are air cooled, rather than water-cooled, to a temperature of about 600 to 1,000° F. Such high temperature far exceeds the 200° F. set by the United States Coast Guard for the exterior temperature of the exhaust system of inboard or stern drive engines.

Although catalytic converters have been required in cars for many years, they have not been required in marine vessels with inboard or stern drive engines. However, in 2009, catalytic converters began being required by federal law in new marine vessels with inboard or stern drive engines. This requirement is challenging because it has been difficult to maintain a sufficiently cooled exterior temperature for marine applications while also maintaining a sufficiently high enough temperature in the element or core of the catalytic converter. The United States Coast Guard has a limit of 200° F. for the exterior temperature of the exhaust system of inboard or stern drive engines. The United States Environmental Protection Agency ("USEPA") has emissions standards which require use of a catalytic converter in inboard or stern drive engines.

One known method of reducing the exterior temperature of the housing in which resides a catalytic converter for a marine vessel is to water cool the housing. This concept is disclosed in U.S. Patent Publication No. US 2009/0175772, published Jul. 9, 2009.

However, there is a need to maintain all exposed surfaces below the 200° F. limit by surrounding the exhaust manifold with liquid to cool the tubes containing the exhaust prior to these exhaust gases entering a liquid cooled catalytic converter.

SUMMARY OF THE INVENTION

According to embodiments of the present invention, an exhaust system for a marine engine comprises the combination of a liquid-cooled exhaust manifold assembly and a liquid-cooled catalytic converter assembly. The exhaust manifold assembly comprises a plurality of tube assemblies, each of the tube assemblies comprising an exhaust tube extending from a mounting plate secured to a marine engine to the catalytic converter assembly and an outer tube surrounding the exhaust tube. These concentric tubes are different lengths, the outer tube being shorter than the exhaust tube. The tubes are twisted, optimized in size and shape, to give optimal engine performance. The outer tube of each tube assembly is spaced from the exhaust tube and defines a cooling cavity therebetween. The outer and inner or exhaust tubes of each tube assembly are welded to the mounting plate, thereby increasing the efficiency of the manufacturing process. More specifically, the exhaust tube of each tube assembly is flared at one end, the flared portion being welded to the outer tube and being welded to the mounting plate. The outer tube of each tube assembly has flattened sides adapted to fit inside a similarly shaped opening in the mounting plate. The catalytic converter assembly, located downstream of the liquid-cooled exhaust manifold assembly, functions to control engine exhaust emissions exiting the liquid-cooled exhaust manifold assembly.

The exhaust manifold assembly further comprises a feed tube and a collector. Liquid in the form of water or glycol is circulated from a fluid source via a first pump through a feed tube. The feed tube may be made of stainless steel and have liners inside extension of the feed tube. The liners may be made of soft steel and are intended to rust before the feed tube does. The feed tube is in fluid communication with the cooling cavity of each tube assembly. The cooling fluid used in the exhaust manifold assembly is collected in a collector after having passed through the cooling cavities of the tube assemblies and exits the collector through a collector outlet so as to always maintain the outside temperature of the outer tubes of the exhaust manifold assembly at less than 200° F. whenever the engine to which the manifold is connected is operated.

An inlet port is provided for supplying cooling water to fluid passage surrounding a catalytic converter housing to cool and maintain the outside surface of the catalytic converter assembly below a predetermined temperature. This water passage surrounding the catalytic converter discharges the water into the exhaust gases at the discharge end of the catalytic converter assembly.

Water from a second pump is also circulated through a fluid passage surrounding the catalytic converter housing so that the catalytic converter is always water-cooled and the outside temperature of the converter assembly maintained at a temperature of less than 200° F. when the engine is operated. From the exhaust or downstream side of the catalytic converter assembly, the water from the fluid passage flows around the catalytic converter assembly inner shell and is mixed with exhaust gases to be discharged with the exhaust gases after the gases have passed through the catalytic converter.

According to another aspect of the present invention, the exhaust system for a marine engine comprises: a liquid-cooled catalytic converter assembly including a catalytic converter fixed inside an inner shell and an outer shell surrounding the inner shell, the inner and outer shells defining a fluid passage therebetween. The outer shell is joined to the inner shell proximate an inlet end of the catalytic converter assembly. The outer shell has a fluid inlet in fluid communication with the fluid passage to introduce fluid into the fluid passage to cool and maintain the outside surface of the catalytic converter assembly below a predetermined temperature when liquid passes through the fluid passage.

The liquid-cooled exhaust manifold assembly comprises a plurality of tube assemblies welded to a mounting plate, each of the tube assemblies comprising an exhaust tube and an outer tube surrounding the exhaust tube. The outer tube is spaced from the exhaust tube and defines a cooling cavity therebetween. Liquid is supplied to the cooling cavity via a feed tube and is collected in a collector. The cooling liquid passes through the collector and exits via a collector port or outlet to cool the outside surface of the outer tube to maintain the outside temperature of the outer tube below a predetermined temperature. The outer tube of each tube assembly is welded to a baffle, which is welded to the collector to keep fluid used in the exhaust manifold assembly separate from fluid used in the catalytic converter assembly.

According to another aspect of the present invention, the exhaust system for a marine engine comprises a liquid-cooled exhaust manifold assembly and a liquid-cooled catalytic converter assembly downstream of the manifold assembly. The catalytic converter assembly includes a catalytic converter, an inner shell and an outer shell surrounding the inner shell. The inner and outer shells define a fluid passageway therebetween. The outer shell has a fluid inlet in fluid communication with the fluid passage to introduce fluid into the fluid passage to cool and maintain the outside surface of the catalytic converter assembly below a predetermined temperature when liquid passes through the fluid passage.

The liquid-cooled exhaust manifold assembly comprises a feed tube, a collector having an outlet and a mounting plate for securing the exhaust system to the marine engine. A plurality of tube assemblies are welded to the mounting plate. Each of the tube assemblies comprises an exhaust tube and an outer tube surrounding the exhaust tube. The outer tube of the tube assembly is shorter than the exhaust tube. The outer tube is welded to the mounting plate at one end and welded to a baffle at the other end, the baffle being welded to the collector. Each of the exhaust tubes is welded to the mounting plate at one end and to the catalytic converter assembly at the other end. Fluid may be introduced through the feed tube, passed between the exhaust and outer tubes of each of the tube assemblies and out the outlet of the collector to cool the outside surface of the tube assemblies to maintain the outside temperature of the tube assemblies below a predetermined temperature.

Thus, the exhaust system of the present invention has two separate cooling systems, each one functioning to cool the exterior temperature of a part of the exhaust system. These and other objects and advantages will be more readily apparent from the following drawings and detailed description.

BRIEF DESCRIPTION OF THE DRAWINGS

FIG. 5 is a cross sectional view of a portion of the exhaust system of FIG. 1;

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION OF THE DRAWINGS

Figure 1:
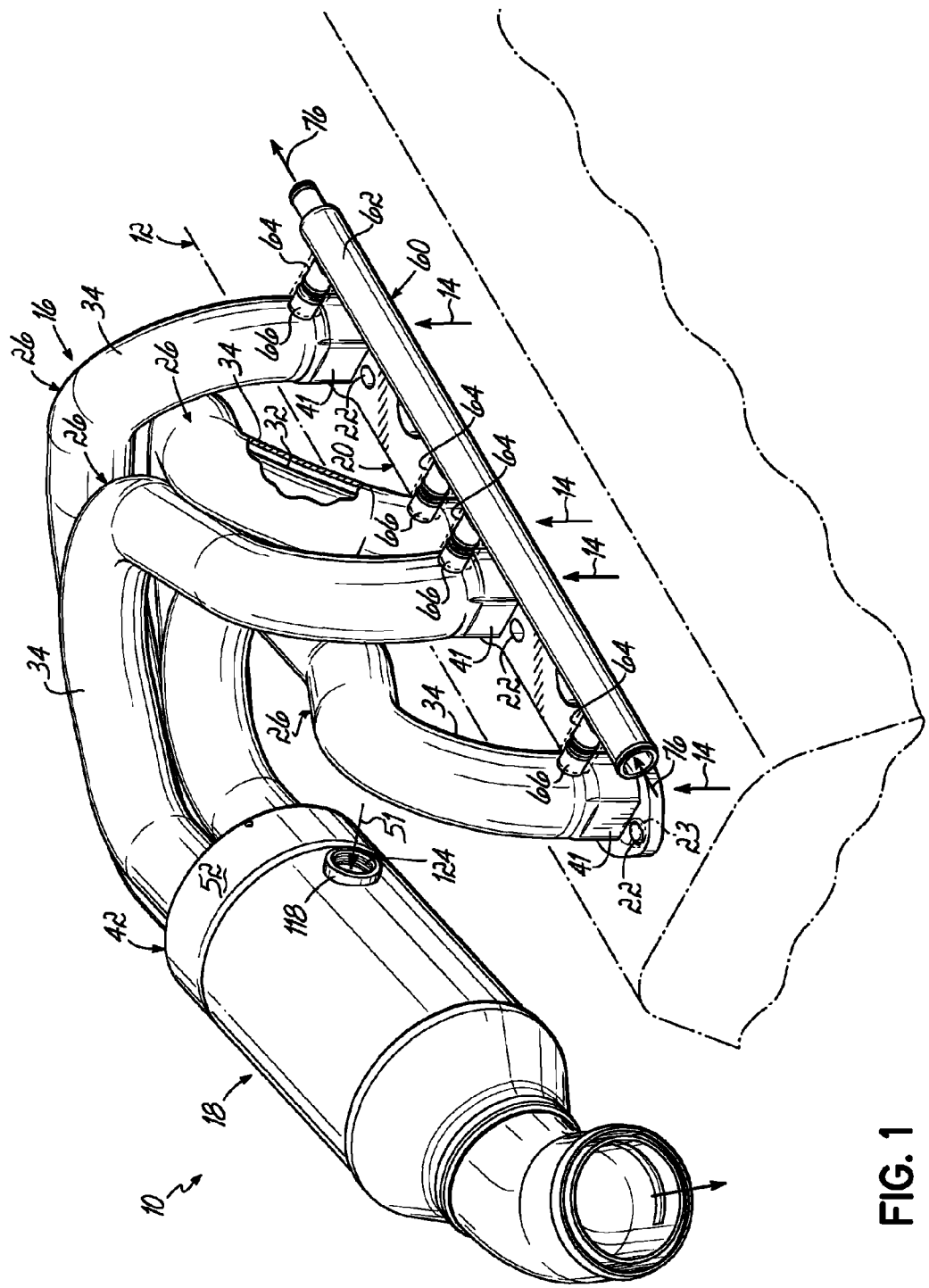
FIG. 1 is a perspective view of an exhaust system in accordance with the present invention, a portion being cut away.

Referring to the drawings, and particularly to FIG. 1, there is illustrated a diagrammatic illustration of an exhaust system 10 for a marine engine 12 (shown in phantom in FIG. 1). Arrows 14 are shown in FIG. 1 illustrating exhaust gases exiting the cylinders of the marine engine 12 and entering the exhaust system 10. Although the drawings illustrate the engine 12 having four cylinders, those skilled in the art will appreciate that the present invention may be used with two cylinder marine engines or any other like engine.

The exhaust system 10 comprises a combination of two basic components: a liquid-cooled exhaust manifold assembly 16 and a liquid-cooled catalytic converter assembly 18 located downstream of the exhaust manifold assembly 16. In order to assemble the exhaust system 10, the two components, the liquid-cooled exhaust manifold assembly 16 and a liquid-cooled catalytic converter assembly 18, are welded together.

Figure 2:
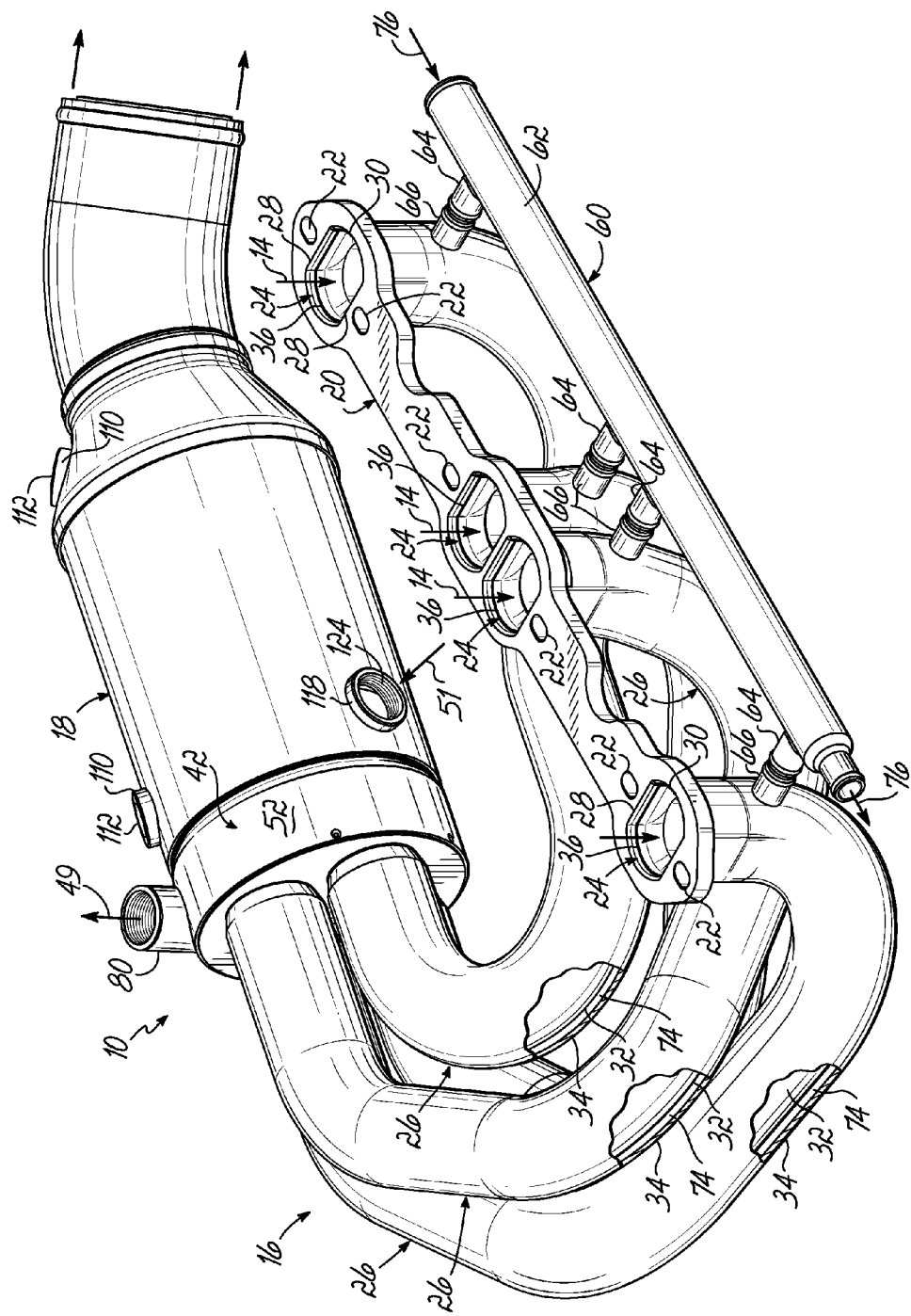
FIG. 2 is a perspective view of the exhaust system of FIG. 1, additional portions being cut away.

Referring to FIGS. 1 and 2, the components of the liquid-cooled exhaust manifold assembly 16 will be described. The liquid-cooled exhaust manifold assembly 16 comprises a mounting plate 20 made of steel having mounting holes 22 therethrough for mounting the liquid-cooled exhaust manifold assembly 16 to the engine block 12 with fasteners 23 (only one being shown in FIG. 1). As best shown in FIG. 2, mounting plate 20 also has a plurality of spaced exhaust holes 24 therethrough which allow the exhaust gases to pass through the mounting plate 20 and into the catalytic converter assembly 18 via tubular tube assemblies 26. As best illustrated in FIGS. 1 and 2, each of the tube assemblies 26 comprises an exhaust tube or inner tube 32 and an outer tube 34 surrounding the exhaust tube 32. Each of the exhaust tubes 32 and each of the outer tubes 34 has a hollow interior, the exhaust tube 32 and outer tube 34 of each tube assembly 26 being concentric.

As best illustrated in FIG. 2, each of the exhaust holes 24 of mounting plate 20 has a non-circular shape. Each of the exhaust holes 24 has what is known in the industry as a "double D" shape having two flat sides 28 and two arcuate or curved sides 30.

Figure 7:
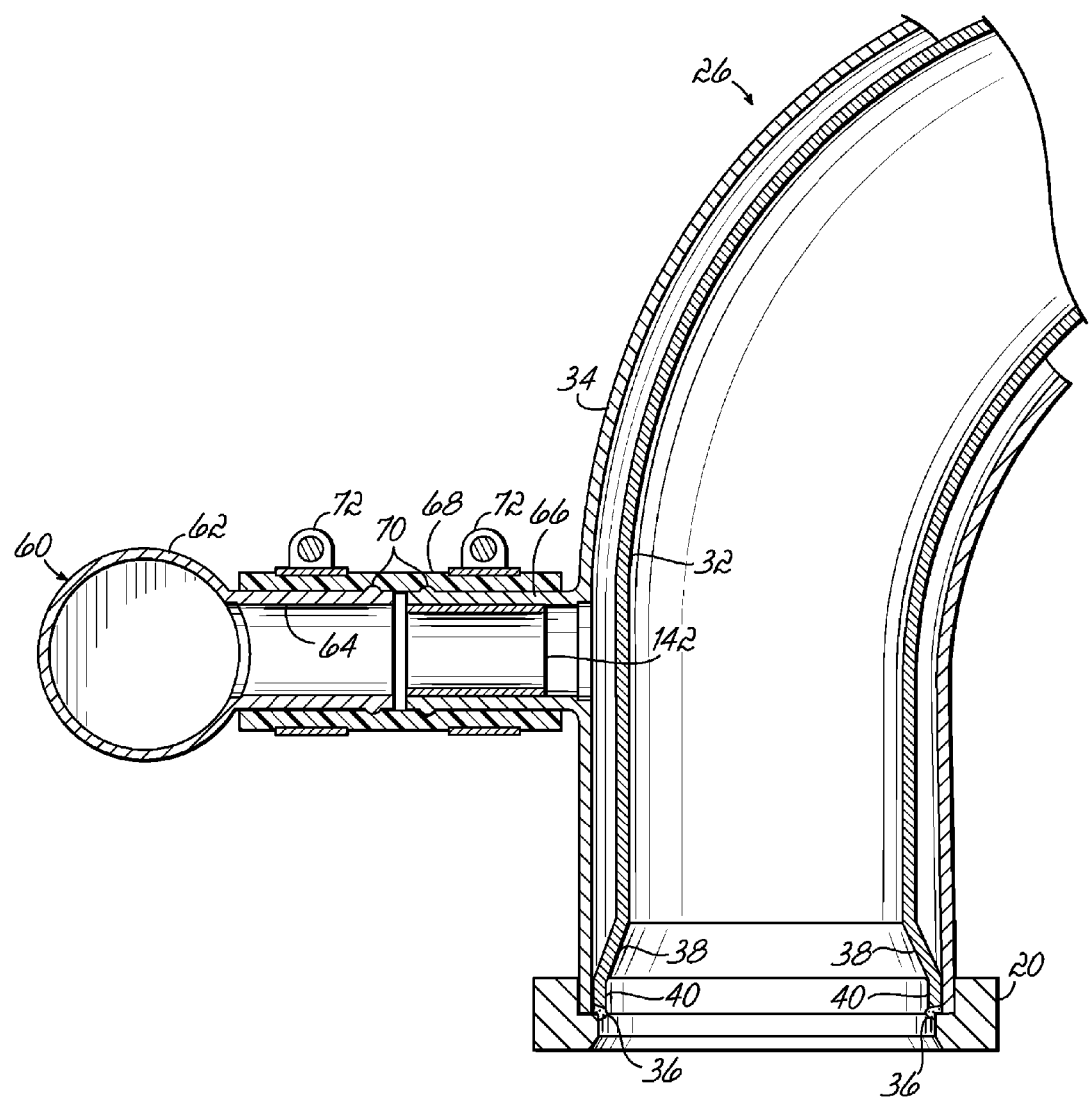
FIG. 7 is a cross-sectional view of a portion of the exhaust system of FIG. 1.

As shown in FIGS. 2 and 7, the exhaust tube 32 and outer tube 34 of each tube assembly 26 are secured to each other and to the mounting plate 20 via a continuous circular weld 36. As best shown in FIG. 7, the exhaust tube 32 of each tube assembly 26 is flared outwardly at one end along a flared portion 38, thereby giving an end portion 40 of the exhaust tube 32 a larger diameter than the diameter of the remainder of the exhaust tube 32. This flaring of the exhaust tube 32 enables the exhaust tube 32 to be welded to the outer tube 34 of the tube assembly 26 with continuous weld 36, as shown in FIG. 7.

As shown in FIG. 1, the end of each outer tube 34 of each tube assembly 26 has opposed flattened sides 41 which are sized to fit inside the uniquely shaped exhaust holes 24 of the mounting plate 20. In other words, each tube assembly 26 is sized to fit inside one of the exhaust holes 24 of the mounting plate 20 and be welded to the mounting plate 20 from the upper side of FIG. 2 with a continuous weld 36. See FIG. 7 also.

Figure 3:
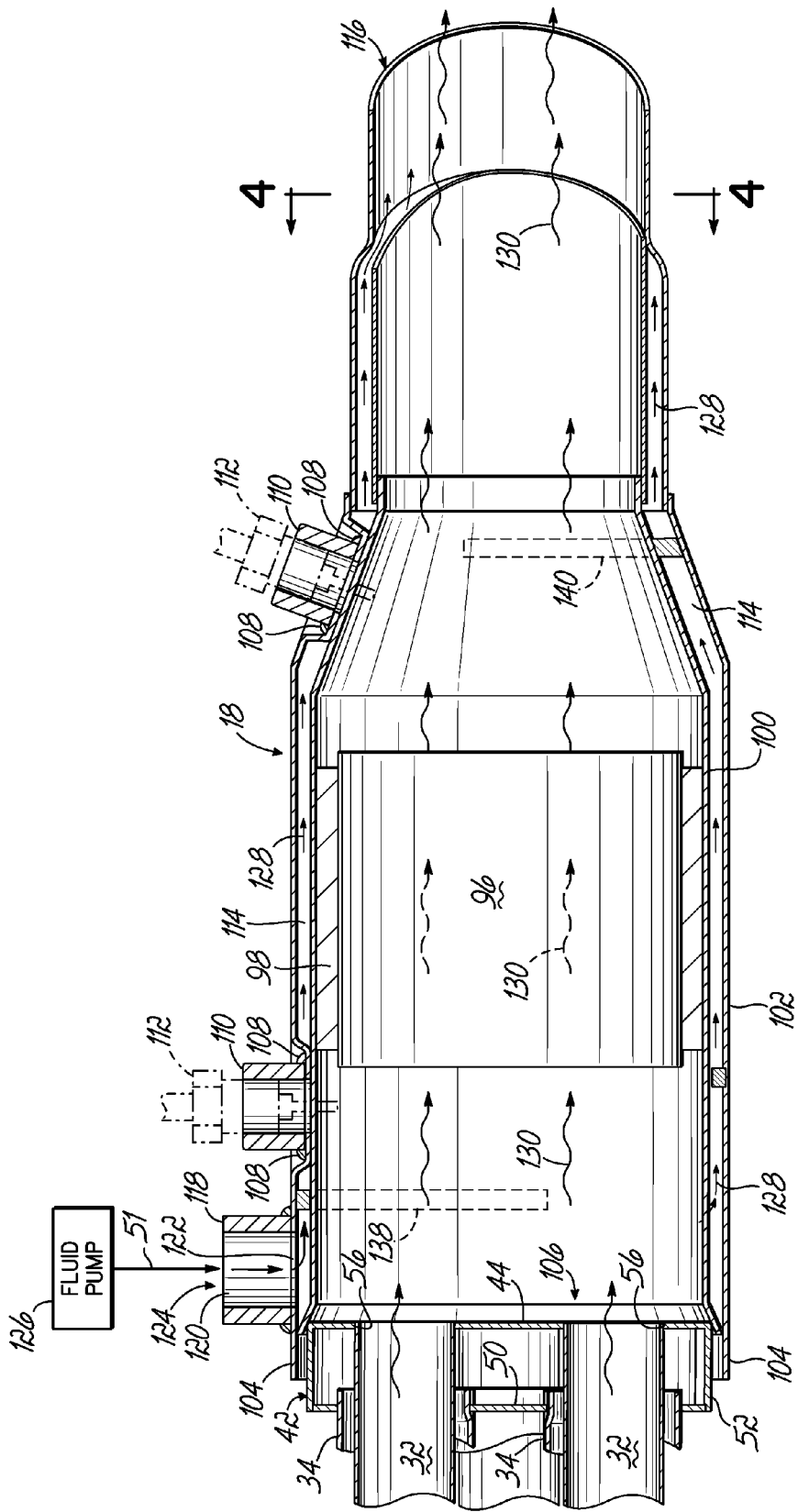
FIG. 3 is a cross sectional view of a portion of the exhaust system of FIG. 1.
Figure 5A:
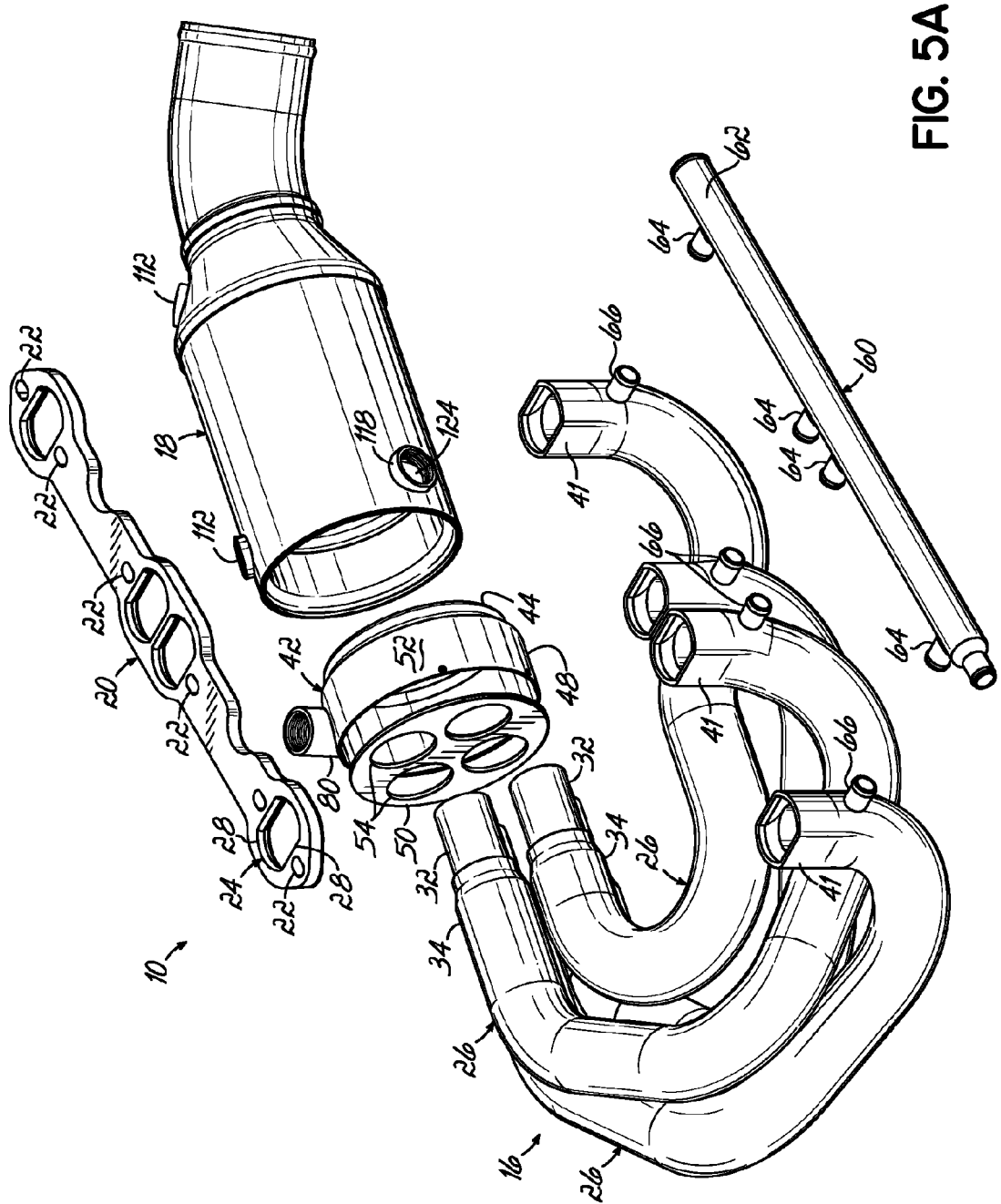
FIG. 5A is a partially disassembled perspective view of the exhaust system of FIG. 1.

As shown in FIGS. 2, 5 and 7, the exhaust tube 32 of each tube assembly 26 is welded at one end to the outer tube 34 of the tube assembly and mounting plate 20 at weld 36. As shown in FIG. 5, the other end of the hollow tubular exhaust tube 32 of each tube assembly 26 is welded to a collector 42 and, more specifically, to a bottom portion 44 of the collector 42 at locations 46, as shown in FIG. 5. As best shown in FIG. 5A, the collector 42 has a cup-shaped portion 48 and a baffle 50. The cup-shaped portion 48 includes bottom portion 44 and a continuous side portion 52 extending towards the catalytic converter assembly 18 from the bottom portion 44. The baffle 50 has four circular holes 54 through which pass the exhaust tube assemblies 26, as shown in FIGS. 5 and 5A. As shown in FIG. 5, the outer tubes 34 of the tube assemblies 26 are welded to the baffle 50 at locations 58 and extend partially beyond the baffle 50 into the interior of the cup-shaped portion 48 of collector 42. Like the baffle 50, the bottom portion 44 of cup-shaped portion 48 of collector 42 has four circular holes 56 through which pass the exhaust tubes 32 of the tube assemblies 26, as shown in FIGS. 3 and 5. The inner or exhaust tubes 32 of the tube assemblies 26 are welded at locations 46 to the bottom portion 44 of cup-shaped portion 48 of collector 42 and extend partially beyond the bottom portion 44 of cup-shaped portion 48 of collector 42.

Each of the tubular exhaust tubes 32 is the same length to optimize engine performance. Similarly, each of the outer tubes 34 is the same length to optimize engine performance. The hollow exhaust tubes 32 are longer than the outer tubes 34 of each tube assembly 26. During operation of the marine engine 12, exhaust gases pass through the interior of the tubular exhaust tubes 32 into the catalytic converter assembly 18, as shown by arrows 15. See FIG. 5.

As best shown in FIGS. 1, 2 and 7, exhaust manifold assembly 16 further comprises a feed tube 60 having a main linear portion 62 and a plurality of extensions 64. Each of the extensions 64 extends perpendicular to the main linear portion 62. The feed tube 60 may be made of stainless steel. The outer tube 34 of each tube assembly 26 has a nipple 66, shown in cross-section in FIG. 7 and shown in perspective in FIGS. 1 and 2. As shown in FIG. 7, a connector 68 extends between the nipple 66 of the outer tube 34 of the tube assembly 26 and the extension 64 of the feed tube 60. The connector 68 covers the outer surfaces of the nipple 66 of the outer tube 34 of the tube assembly 26 and the extension 64 of the feed tube 60. In one embodiment, the connector is a rubber hose; however, it may be made of any desirable material. Both the nipple 66 of the outer tube 34 of the tube assembly 26 and the extension 64 of the feed tube 60 have an annular bump 70 which aids in maintaining the connector 68 in place. A pair of hose clamps 72, a first clamp over the portion of connector 68 surrounding the nipple 66 of the outer tube 34 of the tube assembly 26 and a second clamp surrounding the connector 68 over the extension 64 of the feed tube 60, help secure them together. When tightened, the hose clamps 72 constrict or tighten the connector 68 over the nipple 66 of the outer tube 34 of the tube assembly 26 and the extension 64 of the feed tube 60, as shown in FIG. 7.

As shown in FIGS. 2 and 7, each tube assembly 26 has a cooling cavity 74 defined by the inner and outer tubes 32, 34 spaced from each other. As shown in FIG. 2, exhaust from the marine engine 12 passes through the tubular exhaust tubes 32 into the catalytic converter assembly 18. This exhaust is cooled by either glycol or water passing through the cooling cavities 74 of the tube assemblies 26. As shown by arrows 76, the cooling fluid enters the cooling cavities 74 from the feed tube 60 through the extensions 64 of the feed tube 60 and then through the nipples 66 of the outer tubes 34 of tube assemblies 26. The cooling fluid, as shown by arrows 78 of FIG. 5, passes through the cooling cavities 74 of the tube assemblies 26 and enters the interior of collector 42. Once inside the collector 42, the cooling fluid exits the collector 42 via fluid or collector outlet 80, as shown by arrow 49 in FIGS. 2 and 5. The cooling fluid exiting the collector outlet 80 of collector 42, shown by arrow 49 of FIGS. 2 and 5, may be recycled as shown in FIG. 6 or returned to its source, as shown in FIG. 6A.

Figure 6:
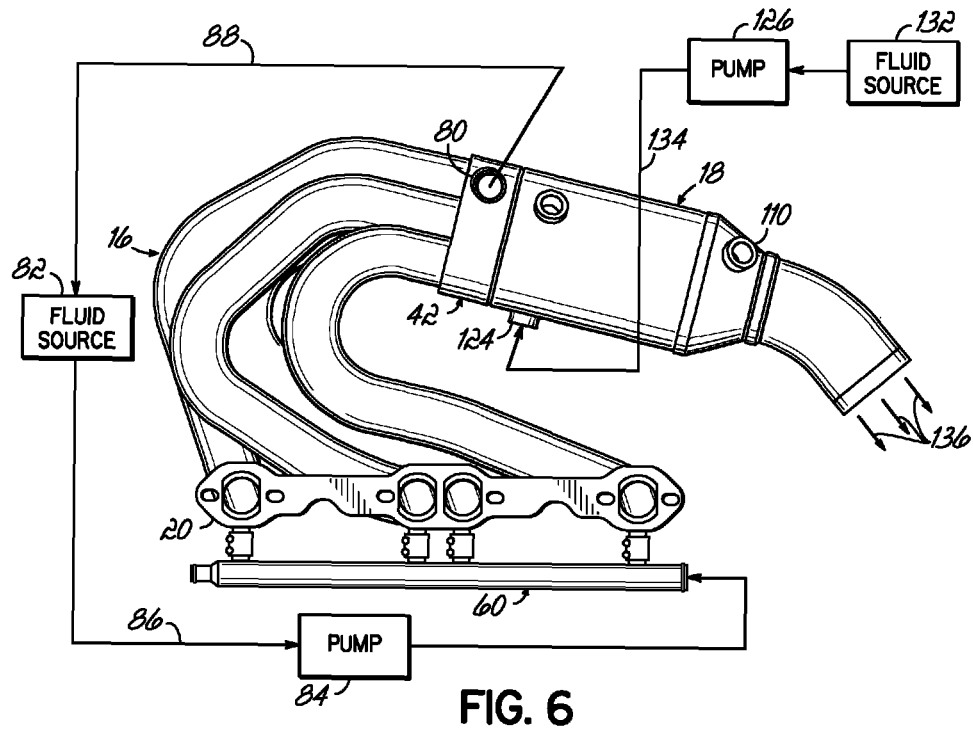
FIG. 6 is a schematic illustration of the flow of fluids in accordance with one embodiment of the invention.

According to one aspect of the invention shown in FIG. 6, glycol from a fluid source 82 is pumped via a first pump 84 via conduit or pipe 86 to the feed tube 60, through the cooling cavities 74 of the tube assemblies 26 of the exhaust manifold assembly 16, out the cooling cavities 74 of the tube assemblies 26 into collector 42, out collector 42 via collector outlet 80 and passes via conduit or pipe 88 back to the fluid source 82. This is considered a closed-loop system and used primarily for use in salt water to prevent corrosion of the exhaust tube assemblies 26.

Figure 6A:
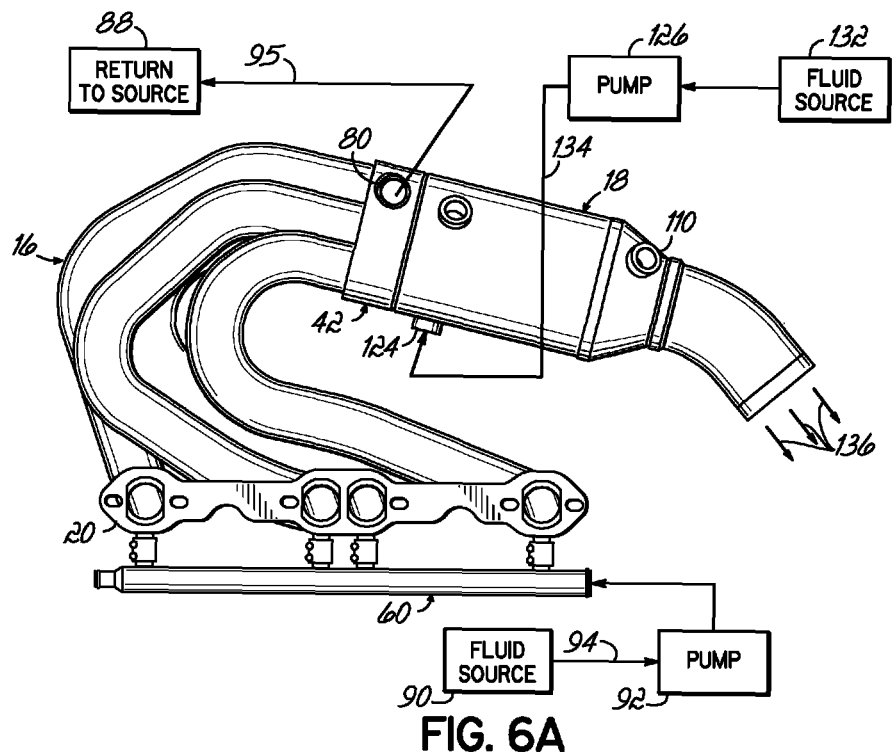
FIG. 6A is a schematic illustration of the flow of fluids in accordance with another embodiment.

According to another aspect of the invention shown in FIG. 6A, water from a fluid source 90 is pumped via a first pump 92 via conduit or pipe 94 to the feed tube 60, through the cooling cavities 74 of the exhaust tube assemblies 26, out the collector 42 via collector outlet 80 and passes via conduit or pipe 96 back to the fluid source, which is commonly the water of a water body on which the boat is used. This is considered an open system and used primarily for use in fresh water without affecting the tubular exhaust assemblies 26 which are exposed to the fluid of the cooling cavities 74 in both embodiments.

Figure 4:
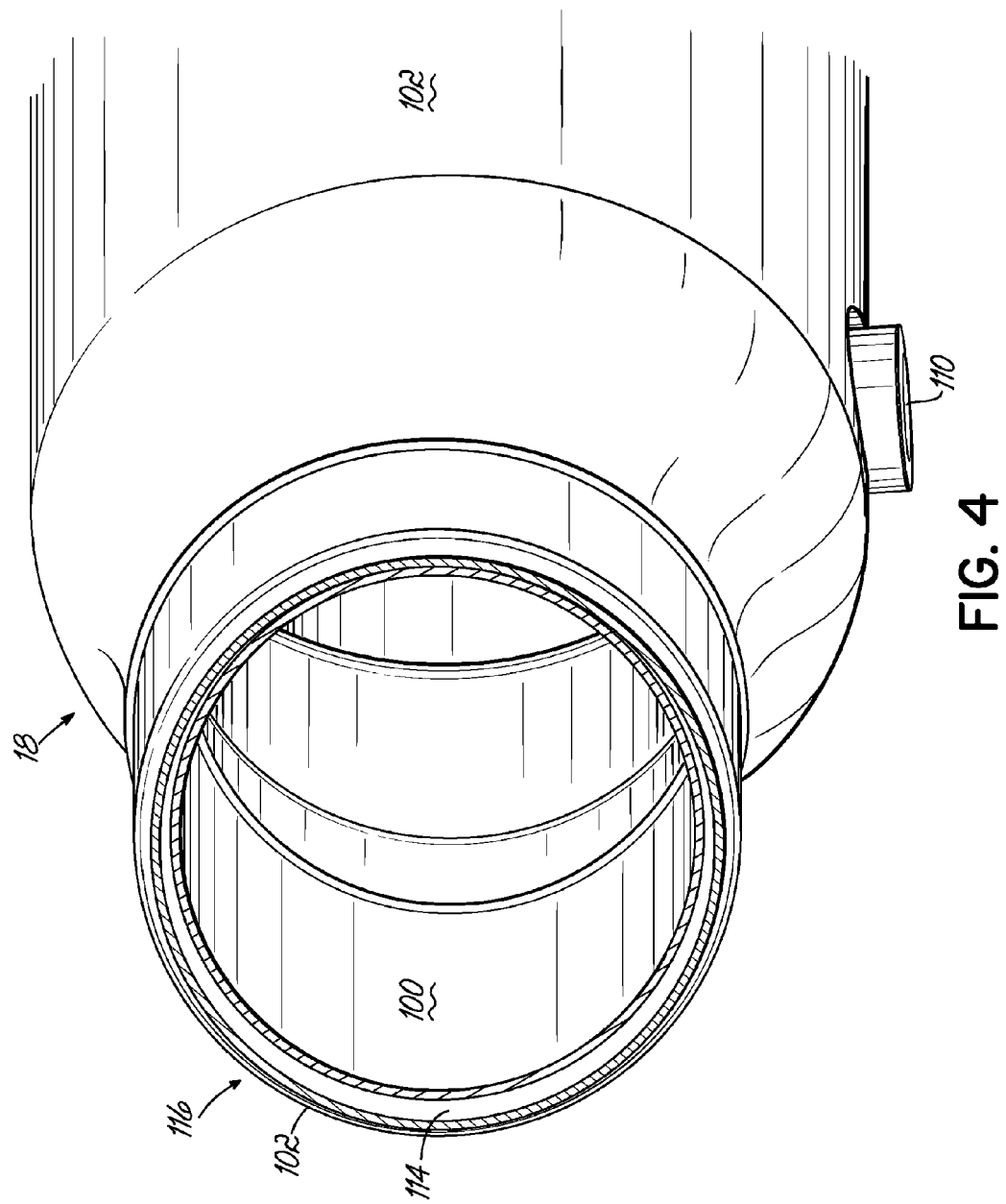
FIG. 4 is a view taken along the line 4-4 of FIG. 3.

FIGS. 3 and 4 illustrate the liquid-cooled catalytic converter assembly 18 which comprises a catalytic converter 96 held in place via a compressible mat 98 inside an inner shell or housing 100. An outer shell 102 surrounds the inner shell 100 and is welded to the inner shell 100 at location 104 proximate an inlet 106 to the liquid-cooled catalytic converter assembly 18 and at locations 108 proximate bosses 110. Bosses 110 are adapted to receive oxygen sensors 112 which help determine whether catalytic converter 96 is functioning properly. A fluid passage 114 is defined between the inner and outer shells 100, 102. As shown in FIGS. 3 and 4, the inner shell 100 is not concentric with the outer shell 102 proximate an outlet 116 of the liquid-cooled catalytic converter assembly 18. Therefore, as shown in FIG. 4, the fluid passage 114 is crescent-shaped in cross-section proximate the outlet 116 of the catalytic converter assembly 18.

A boss 118 having a passage 120 therethrough is welded to the outer shell 102 around an opening 122 (see FIG. 3) through the outer shell 102 to create a fluid inlet 124. Water or some other fluid is pumped from fluid pump 126 through the fluid inlet 124 (see arrow 51 of FIGS. 1, 2, 3 and 5) into the fluid passage 114. The fluid is illustrated inside fluid passage 114 by the arrows 128 in FIG. 3, while the exhaust is illustrated by arrows 130 of FIG. 3. After the fluid exits the fluid passage 114, it is mixed with the exhaust gases and both together exit the outlet of the liquid-cooled catalytic converter assembly 18. As illustrated in FIGS. 6 and 6A, fluid, such as water from a fluid source 132, is pumped via a pump 126 via conduit or line 134 into the fluid inlet 124 of the liquid-cooled catalytic converter assembly 18. The fluid is then passed through the fluid passage 114 and exits the liquid-cooled catalytic converter assembly 18, as indicated by the arrows 136, as shown in FIGS. 6 and 6A.

FIG. 3 illustrates two wire mesh dams 138, 140 welded to the inner sleeve 100 and located inside the fluid passage 114 of the liquid-cooled catalytic converter assembly 18. The second wire mesh dam 140 is located downstream of the first wire mesh dam 138. The purpose of these wire mesh dams 138, 140 is to channel the water flow inside the fluid passage 114 to optimize the outer surface cooling of the outer sleeve 102. These wire mesh dams 138, 140 force the water to cascade from section to section, allowing the water to fill around the entire fluid passage 114, resulting in consistent outer surface cooling and reducing the possibility of hot spots. Without these dams, the water flow would partially fill the bottom half of the fluid passage 114, especially at low engine revolution and low pump flow pressure, resulting in the top surface of the sleeve to exceed the maximum allowable temperature.

As shown in FIG. 7, each nipple 66 of each outer tube 34 of each tube assembly 26 has a liner 142 therein. The liner 142 is made of mild steel that will rust before the stainless steel of the feed tube 60. The presence of the liners 142 makes it less likely that the feed tube 60 will rust.

While the present invention has been illustrated by a description of the various embodiments, and while these embodiments have been described in considerable detail, it is not the intention to restrict or in any way limit the scope of the appended claims to such detail. Additional advantages and modifications will readily appear to those skilled in the art. Thus, the invention, in its broader aspects, is therefore, not limited to the specific details, representative apparatus and method, and illustrative examples shown and described. In particular, a person having ordinary skill in the art will appreciate that any of the blocks of the above flowcharts may be deleted, augmented, made to be simultaneous with another, combined, or be otherwise altered in accordance with the principles of the embodiments of the invention. Accordingly, departures may be made from such details without departing from the spirit or scope of applicant's general inventive concept.

Although we have described various embodiments of the invention, we do not intend to be limited except by the scope of the following claims.

We claim:

1. An exhaust system for a marine engine, comprising: a combination of a liquid-cooled exhaust manifold assembly and a liquid-cooled catalytic converter assembly, which liquid-cooled exhaust manifold assembly comprises a plurality of tube assemblies, each of said tube assemblies comprising an exhaust tube extending from a mounting plate secured to the marine engine to the catalytic converter assembly and an outer tube surrounding the exhaust tube, each of the outer tubes being spaced from one of the exhaust tubes and defining a cooling cavity therebetween, liquid being supplied to the cooling cavity via a feed tube and being collected in a collector and passed through a collector outlet to cool the outside surface of the outer tube to maintain the outside temperature of the outer tube below a predetermined temperature, and liquid being supplied to and from a fluid passage surrounding a catalytic converter housing to cool and maintain the outside surface of the catalytic converter assembly below a predetermined temperature wherein each of the exhaust tubes passes through the collector and into the catalytic converter assembly and each of the outer tubes extends into the interior of the collector.

2. The system of claim 1 wherein said feed tube is made of stainless steel.

3. The system of claim 1 wherein said feed tube has a linear main portion and a plurality of extensions, each of said extensions being lined with a liner.

4. The system of claim 1 wherein the exhaust tube of each of said tube assemblies is flared at one end and welded to the outer tube and welded to the mounting plate.

5. The system of claim 1 wherein the outer tube of each of the tube assemblies has flattened sides adapted to fit inside an opening in the mounting plate.

6. The system of claim 1 wherein the outer tube is shorter than the exhaust tube of each of said tube assemblies.

7. The system of claim 1 wherein the liquid being supplied to and from the housing to cool the outside surface of the tube assemblies is water.

8. The system of claim 1 wherein the liquid being supplied to and from the housing to cool the outside surface of the tube assemblies is glycol.

9. An exhaust system for a marine engine, comprising:
a liquid-cooled catalytic converter assembly including a catalytic converter fixed inside an inner shell and an outer shell surrounding the inner shell, the inner and outer shells defining a fluid passage therebetween, the outer shell being joined to the inner shell proximate an inlet end of the catalytic converter assembly, wherein the outer shell has a fluid inlet in fluid communication with the fluid passage to introduce fluid into the fluid passage to cool and maintain the outside surface of the catalytic converter assembly below a predetermined temperature when liquid passes through the fluid passage; and
a liquid-cooled exhaust manifold assembly comprising a plurality of tube assemblies welded to a mounting plate, each of said tube assemblies comprising an exhaust tube and an outer tube surrounding the exhaust tube, each of the outer tubes being spaced from the exhaust tube and defining a cooling cavity therebetween, liquid being supplied to the cooling cavity via a feed tube and being collected in a collector and passed through a collector outlet to cool the outside surface of the outer tube to maintain the outside temperature of the outer tube below a predetermined temperature, the outer tube of each tube assembly being welded to a baffle welded to a collector having an outlet to keep fluid used in the exhaust manifold assembly separate from fluid used in the catalytic converter wherein the outer tube of each of the tube assemblies terminates in the collector and the exhaust tube of each of the tube assemblies passes through the collector and terminates in the catalytic converter assembly.

10. The system of claim 9 wherein the outer tube is shorter than the exhaust tube of each of said tube assemblies.

11. The system of claim 9 wherein the feed tube is made of stainless steel and has a plurality of extensions, each extension being lined with a steel liner.

12. The system of claim 9 wherein said catalytic converter assembly has bosses adapted to receive oxygen sensors.

13. The system of claim 9 wherein said exhaust manifold assembly has four tube assemblies.

14. The system of claim 9 wherein the exhaust tube of each of said tube assemblies is flared out at one end and welded to the outer tube of the tube assembly.

15. The system of claim 9 wherein the outer tube of each of the tube assemblies has flattened sides adapted to fit inside an opening in the mounting plate.

16. An exhaust system for a marine engine, comprising:
a liquid-cooled catalytic converter assembly including a catalytic converter, an inner shell and an outer shell surrounding the inner shell, the inner and outer shells defining a fluid passageway therebetween, wherein the outer shell has a fluid inlet in fluid communication with the fluid passage to introduce fluid into the fluid passage to cool and maintain the outside surface of the catalytic converter assembly below a predetermined temperature when liquid passes through the fluid passage; and a liquid-cooled exhaust manifold assembly comprising a feed tube, a collector having an outlet, a mounting plate for securing the exhaust system to the marine engine, a plurality of tube assemblies welded to the mounting plate, each of said tube assemblies comprising an exhaust tube and an outer tube surrounding the exhaust tube, each of said outer tubes of each of the tube assemblies being shorter than the exhaust tube of the tube assembly and being welded to the mounting plate at one end and welded to a baffle at the other end, said baffle being welded to the collector, each of said exhaust tubes being welded to the mounting plate at one end and being welded to the catalytic converter assembly at the other end, wherein fluid may be introduced through the feed tube, passed between the exhaust tube and the outer tube of each of said tube assemblies and out the outlet of the collector to cool the outside surface of the tube assemblies to maintain the outside temperature of the tube assemblies below a predetermined temperature, wherein the outer tube of each of the tube assemblies terminates in the collector and the exhaust tube of each of the tube assemblies passes through the collector.

17. The system of claim 16 wherein said catalytic converter assembly has bosses adapted to receive oxygen sensors.

18. The system of claim 16 wherein said catalytic converter assembly has two sections of wire mesh welded to the inner shell to optimize cooling.

19. The system of claim 16 wherein said exhaust manifold assembly has four tube assemblies.

20. The system of claim 16 wherein the outer tube of each of the tube assemblies has flattened sides adapted to fit inside an opening in the mounting plate.

\* \* \* \* \*